(12) United States Patent
Friedrichsen et al.

(10) Patent No.: US 9,821,273 B2
(45) Date of Patent: Nov. 21, 2017

(54) REVERSE OSMOSIS SYSTEM

(75) Inventors: Welm Friedrichsen, Nordborg (DK);
Lasse Nicolai Langmaack, Nordborg (DK); Palle Olsen, Nordborg (DK);
Erik Haugaard, Graasten (DK)

(73) Assignee: Danfoss A/S, Nordborg (DK)

( * ) Notice: Subject to any disclaimer, the term of this patent is extended or adjusted under 35 U.S.C. 154(b) by 1054 days.

(21) Appl. No.: 13/577,918

(22) PCT Filed: Feb. 24, 2011

(86) PCT No.: PCT/DK2011/000011
§ 371 (c)(1),
(2), (4) Date: Oct. 2, 2012

(87) PCT Pub. No.: WO2011/103875
PCT Pub. Date: Sep. 1, 2011

(65) Prior Publication Data
US 2013/0037464 A1    Feb. 14, 2013

(30) Foreign Application Priority Data
Feb. 26, 2010    (DE) .................. 10 2010 009 581

(51) Int. Cl.
*B01D 61/06*    (2006.01)
*C02F 1/44*    (2006.01)

(52) U.S. Cl.
CPC ........ *B01D 61/06* (2013.01); *B01D 2313/243* (2013.01); *C02F 1/441* (2013.01)

(58) Field of Classification Search
CPC .. C02F 1/44; C02F 1/441; C02F 1/442; C02F 1/444; C02F 1/445; B01D 61/06; B01D 2313/243
See application file for complete search history.

(56) References Cited

U.S. PATENT DOCUMENTS

| 3,637,081 | A |   | 1/1972 | Bradley |
| 3,708,069 | A | * | 1/1973 | Clark ................... B01D 61/08 210/181 |

(Continued)

FOREIGN PATENT DOCUMENTS

| CN | 1546390 A | 11/2004 |
| DE | 3781148 T2 | 3/1993 |

(Continued)

OTHER PUBLICATIONS

"When to use a Positive Displacement Pump" from www.pumpschool.com (2007) (obtained Sep. 2017).*

(Continued)

*Primary Examiner* — Lucas Stelling
(74) *Attorney, Agent, or Firm* — McCormick, Paulding & Huber LLP

(57) ABSTRACT

The invention concerns a reverse osmosis system (1) with at least one membrane unit (2) comprising an inlet (3), a permeate outlet (4) and a concentrate outlet (5), a high-pressure pump (8) that is connected to the inlet (3), a pressure exchanger (11) comprising at least one high-pressure concentrate connection (HPC), and a booster pump. It is endeavored to achieve the lowest possible energy consumption. For this purpose, the booster pump is made as a displacement pump (16) that is arranged between the concentrate outlet (5) and the high-pressure concentrate connection (HPC) of the pressure exchanger (11).

18 Claims, 3 Drawing Sheets

(56) References Cited

U.S. PATENT DOCUMENTS

| | | |
|---|---|---|
| 4,887,942 A | 12/1989 | Hauge |
| 5,338,158 A | 8/1994 | Hauge |
| 5,482,441 A * | 1/1996 | Permar .................. B01D 61/10 210/416.3 |
| 5,988,993 A | 11/1999 | Hauge |
| 6,468,431 B1 | 10/2002 | Oklelas, Jr. |
| 6,540,487 B2 | 4/2003 | Polizos et al. |
| 7,214,315 B2 | 5/2007 | Shumway |
| 2001/0032498 A1* | 10/2001 | Fujino et al. .................... 73/116 |
| 2002/0025264 A1 | 3/2002 | Polizos et al. |
| 2005/0035048 A1* | 2/2005 | Chancellor .......... B01D 61/022 210/321.89 |
| 2006/0037895 A1* | 2/2006 | Shumway ..................... 210/137 |
| 2006/0062672 A1* | 3/2006 | McBride et al. ............. 416/142 |
| 2007/0137170 A1 | 6/2007 | Bross et al. |
| 2008/0290032 A1 | 11/2008 | Ton That |
| 2009/0045144 A1* | 2/2009 | Cohen et al. ................. 210/745 |
| 2009/0110563 A1 | 4/2009 | Takita et al. |
| 2011/0147285 A1* | 6/2011 | Bonnelye et al. ............ 210/134 |
| 2011/0203987 A1 | 8/2011 | Friedrichsen et al. |

FOREIGN PATENT DOCUMENTS

| | | | |
|---|---|---|---|
| DE | 10 2008 044 869 A1 | 3/2010 | |
| EP | 1547670 A1 | 6/2005 | |
| ES | 2008947 A6 | 8/1989 | |
| WO | 99/17028 A1 | 4/1999 | |
| WO | WO 2010010243 A1 * | 1/2010 | ............. G05B 13/02 |

OTHER PUBLICATIONS

Purcell et al., "A comparison of Positive Displacement and Centrifugal Pump Applications," Proceedings of the 14th International Pump Users Symposium, (1997).*

International Search Report for corresponding PCT/DK2011/000011 dated Sep. 14, 2011.

\* cited by examiner

REVERSE OSMOSIS SYSTEM

CROSS REFERENCE TO RELATED APPLICATIONS

This application is entitled to the benefit of and incorporates by reference essential subject matter disclosed in International Patent Application No. PCT/DK2011/000011 filed on Feb. 24, 2011 and German Patent Application No. 10 2010 009 581.8 filed Feb. 26, 2010.

TECHNICAL FIELD

The invention concerns a reverse osmosis system with at least one membrane unit comprising an inlet, a permeate outlet and a concentrate outlet, a high-pressure pump that is connected to the inlet, a pressure exchanger comprising at least one high-pressure concentrate connection, and a booster pump.

BACKGROUND

For example, a reverse osmosis system serves the purpose of making drinking water from salt water or sewage water, in the following combined to the term "feed water". For this purpose, the feed water is brought to a relatively high pressure, for example 80 bar or more, by the high-pressure pump, and supplied to the inlet of the membrane unit. In the membrane unit is arranged a semi permeable membrane that retains the dirt or the salt of the feed water and only permits the passage of cleaned water, called permeate. This increases the salt and dirt concentration in the remaining feed water. Feed water with the increased concentration, also called concentrate, is discharged from the membrane unit through the concentrate outlet. However, this concentrate is still under a relatively high pressure of, for example, 60 to 70 bar, so that there is a wish to regain the energy content stored in the concentrate. However, the invention is not limited to the use of water as fluid.

It is, therefore, known to connect the concentrate outlet to a pressure exchanger. On the concentrate side, the pressure exchanger is supplied with concentrate under the increased pressure. On the other side, the feed side, feed water is supplied to have its pressure increased by the concentrate. Pressure exchangers are, for example, known from DE 37 81 148 T2, U.S. Pat. No. 5,338,158, U.S. Pat. No. 5,988,993, WO 99/17028 A1, U.S. Pat. No. 6,540,487 B2 or U.S. Pat. No. 7,214,315 B2. The latter publication also mentions the use in a reverse osmosis process.

Usually, however, the pressure exchanger or pressure converter cannot transfer the complete pressure of the concentrate to the feed water. Also the membrane unit has a certain pressure drop between the inlet and the concentrate outlet. In order to bring the share of the feed water that has been brought to a higher pressure by means of the pressure exchanger up to the final, required pressure for the membrane unit, a booster pump is therefore required. This booster pump has to be driven, meaning that it requires additional energy. The control of the booster pump is problematic. When the booster pump supplies too much fluid, it may happen that it does not only supply feed water, but also concentrate, so that the concentrate concentration on the inlet side of the membrane increases, which again results in a reduction of the efficiency. This phenomenon is called "mixing". With a higher salt concentration, the energy consumption increases. Many systems, therefore, use one or more flow meters to prevent a mixing of the fluids.

SUMMARY

The invention is based on the task of keeping the energy consumption as low as possible.

With a reverse osmosis system as mentioned in the introduction, this task is solved in that the booster pump is made as a displacement pump that is arranged between the concentrate outlet and the high-pressure concentrate connection of the pressure exchanger.

A displacement pump is a pump with a positive displacement, in which the fluid is transported through closed volumes. In other words, a displacement pump has a constant supply amount for each work cycle. A work cycle can, for example, be a rotation or a piston stroke or the like. Examples of displacement pumps are piston pumps, gear wheel pumps, gerotor pumps, orbit pumps, membrane pumps, hose pumps, peristaltic pumps, screw pumps, spindle pumps, eccentric screw pumps or vane pumps. These examples do not cover the whole range. A displacement pump has a known efficiency and a sufficiently linear characteristic between the speed and the pump output, that is, the supplied volume. As opposed to that, pumps that do not work with intrinsically closed volumes have no linear dependency between the rotation and the pump output. Such pumps are, for example, centrifugal pumps, jet pumps and turbine pumps. Also here, the examples do not cover the whole range. Compared with a centrifugal pump, a displacement pump has a smaller energy consumption. Firstly, therefore, the use of displacement pumps will cause an energy saving in comparison with the centrifugal pumps used in reverse osmosis systems until now. For a large flow, a centrifugal pump requires a substantially larger speed than a displacement pump. When the pressure exchanger is mounted on the same shaft, it has to run at the same high speed. This may cause that the time is too short for a pressure exchange. A further advantage is that with a displacement pump the flow through the pressure exchanger can be controlled much more accurately than before. This flow is substantially a linear function of the speed of the displacement pump. Accordingly, it can be achieved in a simple manner that, by means of the pressure exchanger the largest possible amount of feed water can be acted upon by the pressure of the concentrate. On the other hand, it can also be avoided that concentrate is led through the pressure exchanger and then reaches the inlet of the membrane unit again. Accordingly, a mixing of feed water and concentrate can practically be avoided, which has a positive effect on the efficiency. The location of the displacement pump at the high-pressure concentrate connection of the pressure exchanger provides some advantages, particularly during the start of the reverse osmosis system. Thus, firstly it is possible to activate the supply pump and to fill the part of the reverse osmosis system lying before the membrane unit with fluid under simultaneous de-aeration. Before starting the high-pressure pump, the displacement pump with the pressure exchanger can be activated, so that also this part is de-aerated. The air can, for example, be discharged to the environment through a valve. By placing the displacement pump in the flow direction before the pressure exchanger, cavitation in the displacement pump can be reduced or even prevented. When, finally, the high-pressure pump is activated, it may therefore be assumed that the system has been completely deaerated.

Preferably, the volumes of the pressure exchanger and the displacement pump are adapted to one another. Accordingly, for a predetermined period the displacement pump supplies exactly the amount of feed water that the pressure exchanger can act upon with increased pressure during the same period. Thus, it may, for example, be provided that the pressure exchanger and the displacement pump have a common control, with which, for example, the speed of the displacement pump and of the pressure exchanger can be controlled in dependence of one another.

In an alternative embodiment, it may be provided that the displacement pump is made as a variable displacement pump. A variable displacement pump has an adjustable supply volume per rotation or work cycle. If, initially the displacement pump does not have a supply volume that is adapted to the volume of the pressure exchanger, this adaptation can be made during operation.

It is particularly preferred that the reverse osmosis system has at least one concentrate sensor. The concentrate sensor detects, if too much concentrate gets into the supply water. If this is the case, the supply volume of the displacement pump is correspondingly reduced, in order to avoid mixing of concentrate and supply water. The adjustment device can work in different manners, for example mechanically, hydraulically or electrically. The concentrate sensor can, for example, be located at the high-pressure supply water outlet of the pressure exchanger. Also other positions can, in a known manner, be expedient. Instead of or additionally to the concentrate sensor, also further sensors, for example flow sensors, can be used.

Preferably, the pressure exchanger and the displacement pump have a common drive shaft. This is a simple way of adapting the speed of the displacement pump to the speed of the pressure exchanger. With a corresponding adaptation of the flow volumes it can be ensured that an optimum operating point is achieved. In this operating point the maximum possible amount of feed water is acted upon by the pressure of the concentrate increased by the displacement pump, without risking a mixing of concentrate and feed water. Further, the common drive shaft offers manufacturing advantages. For example, only one single drive is required for the pressure exchanger and the displacement pump. The pressure exchanger can also be operated with low speeds, as a displacement pump also supplies according to specifications at low speeds.

It is also advantageous, if the displacement pump and the pressure exchanger have a common shaft sealing area. Both the displacement pump and the pressure exchanger have at least one area, at which fluid acts with an increased pressure. The shaft sealing area that is acted upon by a high pressure can now be located between the displacement pump and the pressure exchanger, so that merely a passage for the drive shaft to the outside is required. In the common shaft sealing area the requirements on tightness are lower.

It is also advantageous, if the displacement pump has a pump outlet on a front side, with which it is arranged on the pressure exchanger. In a manner of speaking, this results in a housing, in which a channel for high-pressure water is already provided. Thus, an additional piping can be avoided. This reduces pressure losses, which has a positive effect on the efficiency.

Preferably, the pump outlet is arranged opposite to an outlet of the pressure exchanger. In a manner of speaking, the pump outlet and the outlet of the pressure exchanger on the feed water side are thus arranged in relation to each other on a straight line or somewhat offset in the rotation direction. This causes that the concentrate from the displacement pump with increased pressure can transport the feed water from the rotor of the pressure exchanger into the membrane unit at the lowest possible pressure loss. This also causes a good efficiency.

Preferably, a unit comprising the displacement pump and the pressure exchanger can also be operated in the opposite flow direction, meaning that the displacement pump is connected in series after the pressure exchanger. Thus, the reverse osmosis system can be adapted to different conditions. For example, a simple reversal of the unit comprising the displacement pump and the pressure exchanger permits a direct connection of the pressure exchanger to the concentrate outlet and a location of the displacement pump between the pressure exchanger and the inlet. Particularly, when the space is narrow, such an embodiment can be advantageous.

In a further preferred embodiment, it is provided that the high-pressure pump has a common shaft with the displacement pump. Thus, the high-pressure pump and the displacement pump can be driven by the same motor. All drives can, for example, be made as electric motors that are supplied by a frequency converter, so that also here the speed of the motor(s) can be controlled. The use of a common drive shaft for the high-pressure pump and the displacement pump has the advantage that the control of the reverse osmosis system becomes easier. In the first line, the high-pressure pump is responsible for providing the membrane unit with the required amount of fluid. Among other things, the required amount of fluid depends on the amount of fluid tapped at the permeate outlet. Also the amount of concentrate depends on the amount of permeate. If a larger amount of permeate is tapped, more fluid passes through the system, and a larger amount of concentrate automatically occurs. This gives an approximately linear dependence between the supply performance of the high-pressure pump and the amount of concentrate. As it is intended for the concentrate to supply its pressure almost completely to the feed water, a corresponding amount of feed water has to be transported. The dependence between the supply of the feed water through the displacement pump and the supply of feed water through the high-pressure pump is thus also linear to a sufficient degree. Accordingly, a common drive shaft can be used without problems, which however requires that a displacement pump is used as booster pump.

Preferably, the high-pressure pump, the pressure exchanger and the displacement pump are assembled to form to one unit. This firstly has the effect that the high-pressure pump, the pressure exchanger and the displacement pump have a common drive shaft and are driven by a common motor. This motor can be a speed-controlled electric motor in order to adapt the supply performance to the permeate requirement. Further, this embodiment has the advantage that a smaller number of sealings towards the outside is required. In connection with the shaft, for example, one shaft sealing is sufficient, when the shaft is led out from the component at a front side. Further, the required channels can be located in the component, so that an external piping or line connection can be avoided, but also the energy consumption sinks, as pressure losses are reduced.

It is preferred that the pressure exchanger is arranged between the displacement pump and the high-pressure pump. This results in a favourable channelling for the individual fluids, that is, for the concentrate and for the feed water. This favourable channelling contributes to keeping pressure losses small and thus to making the efficiency as high as possible.

Preferably, the pressure exchanger and the high-pressure pump have a common outlet from the component and/or a common inlet into the component. This simplifies the piping between the component and the membrane unit. In fact, only one single pipe between the inlet of the membrane unit and the component is required. As this helps keeping the pressure losses small, this measure contributes to a good efficiency.

Preferably, on the concentrate side, the pressure exchanger has a concentrate influencing device comprising at least one of the following elements: a bypass valve, a pressure relief valve and a throttle valve. The bypass valve, for example, permits a pressure relief of the concentrate outlet of the membrane unit. The pressure relief valve prevents the displacement pump from being acted upon by an impermissibly high pressure on the concentrate side, and the throttle valve can be used to prevent the risk of cavitation. Further, this throttle valve contributes to influencing the flow of low-pressure feed water to the low-pressure concentrate. All three elements can be used individually, in pairs or all three at a time.

It is also preferred, if a non-return valve is arranged in parallel to the high-pressure pump. The non-return valve can have the form of a spring-biased non-return valve in order to avoid that the pressure difference over the high-pressure pump gets too large.

BRIEF DESCRIPTION OF THE DRAWINGS

In the following, the invention is described on the basis of preferred embodiments in connection with the drawings, showing.

DETAILED DESCRIPTION

Figure 1:
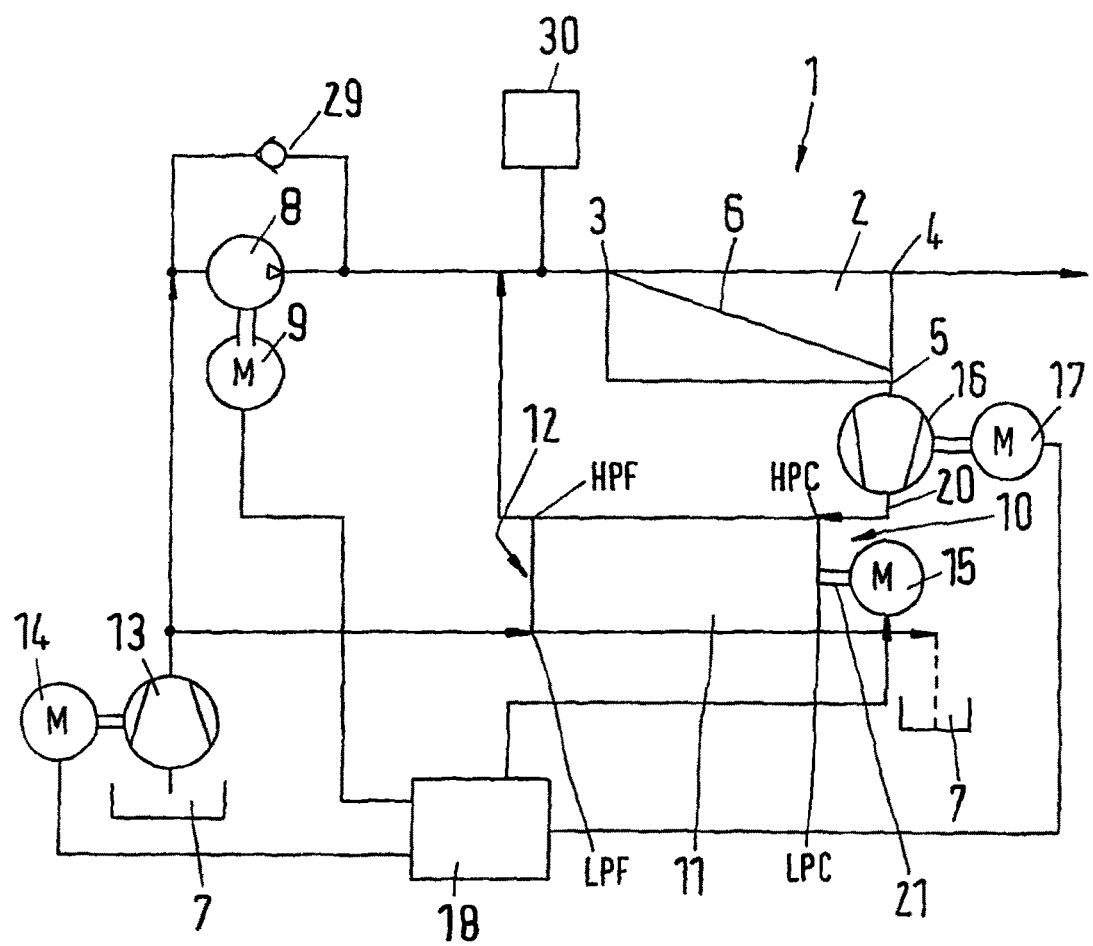
FIG. 1 shows a first embodiment of a reverse osmosis system.

FIG. 1 is a schematic view of a reverse osmosis system 1, also called reverse osmosis plant or reverse osmosis arrangement.

The reverse osmosis system comprises a membrane unit 2 with an inlet 3, a permeate outlet 4 and a concentrate outlet 5. A membrane 6 is arranged between the inlet 3 and the permeate outlet 4.

Of course, the membrane unit 2 can also have more than one inlet 3, one permeate outlet 4 and/or one concentrate outlet 5, and a corresponding housing.

By means of a high-pressure pump 8 that is driven by a motor 9, the membrane unit 2 is supplied with feed water from a storage 7, for example the sea. The high-pressure pump 8 can, for example, be a piston pump. The motor 9 can be an electric motor that is controlled by a frequency converter. Thus, it is possible to drive the high-pressure pump 8 at variable speeds and thus variable supply amounts.

For reasons of simplicity, the water from the storage 7 will, in the following, simply be called "feed water".

Via a displacement pump 16, the concentrate outlet 5 is indirectly connected to a concentrate side 10 of a pressure exchanger 11. In this connection, the displacement pump is connected to a high-pressure concentrate connection HPC of the concentrate side 10. In this embodiment, the concentrate side 10 also comprises a low-pressure concentrate connection LPC that is again connected to the storage 7.

The pressure exchanger 11 also comprises a feed water side 12 with a low-pressure feed water connection LPF and a high-pressure feed water connection HPF. The low-pressure feed water connection LPF is connected to a feed water pump 13 that also supplies the high-pressure pump 8 with feed water. The feed water pump 13 is also driven by a motor 14. Also different pumps can be used to supply the high-pressure pump 8 and the pressure exchanger 11.

Instead of the subdivision into a concentrate side 10 and a feed water side 12, the high-pressure concentrate connection HPC and the low-pressure feed water connection LPF as well as the high-pressure feed water connection HPF and the low-pressure concentrate connection LPC can be arranged on one side. This will cause a reversed direction of the flow through a low-pressure area of the pressure exchanger 11. The flow from the low-pressure concentrate connection LPC to the high-pressure concentrate connection HPC in the pressure exchanger 11 then occurs in the different direction than the flow from the low-pressure feed water connection LPF to the high-pressure feed water connection HPF.

The pressure exchanger 11 is driven by a motor 15, here making a rotor of the pressure exchanger 11 rotate. In a manner known per se, a channel of the rotor is filled with feed water via the low-pressure feed water connection LPF. The feed water presses concentrate contained in the channel out through the low-pressure concentrate connection LPC, the concentrate thus returning to the storage 7. When the rotor has been turned by a predetermined angle, for example approximately 180°, the concentrate at the high-pressure concentrate connection HPC will push the feed water out through the high-pressure feed water connection HPF.

Between its inlet 3 and its concentrate outlet 5, the membrane unit 2 has a certain pressure loss, and also the pressure exchanger 11 causes a certain pressure loss. Accordingly, before the pressure exchanger 11 the booster pump is arranged in the form of a displacement pump 16. The displacement pump 16 is driven by a motor 17. By means of the displacement pump, the pressure of the concentrate before the pressure exchanger 11 is increased so much that the feed water is supplied from the high-pressure feed water connection under a pressure that corresponds to the pressure at the outlet of the high-pressure pump 8.

With each rotation, the displacement pump supplies a constant volume, independently of the speed. This gives an approximately linear correlation between the speed and the supply amount. The displacement pump 16 can be a piston pump, a gearwheel pump, a gerotor pump, an orbit pump, a membrane pump, a hose pump, a peristaltic pump, a screw pump, a spindle pump, an eccentric screw pump, a vane pump or the like. Such a displacement pump 16 has a better efficiency than, for example, a centrifugal pump, a jet pump or a turbine pump.

The motors 9, 14, 15 and 17 can be controlled by a control device 18. The control device 18 "knows" the output provided by the pressure exchanger 11. Accordingly, the control device 8 can control the motor 17 of the displacement pump 16 so that the displacement pump 16 can relatively easily provide the supply amount that is adapted to the output of the pressure exchanger 11. A major advantage of the displacement pump 16 namely is that, as mentioned, that it has a linear dependence between the speed and the supply amount, so that the supply amount can be accurately set by a change of the speed. Thus, it is avoided that concentrate from the concentrate connection 5 is mixed with feed water from the feed pump 13. In many cases, it is also possible to adjust the pressure independently of the load.

If further information is required, for example information about the pressure at the concentrate outlet 5, a corresponding pressure sensor may be arranged here, which is then also connected to the control device 18. For reasons of clarity, however, this is not shown.

Optionally, the pipe between the concentrate outlet 5 and the high-pressure concentrate outlet HPC of the pressure exchanger 11 may comprise a measuring motor, not shown, that is also connected to the control device 18.

The measuring motor should also be a motor with constant displacement, that is, independently of the speed, the measuring motor has a constant output per rotation.

The displacement pump 16 can also be a variable displacement pump, that is, the volume displaced per rotation can be set at a desired value.

Figure 2:
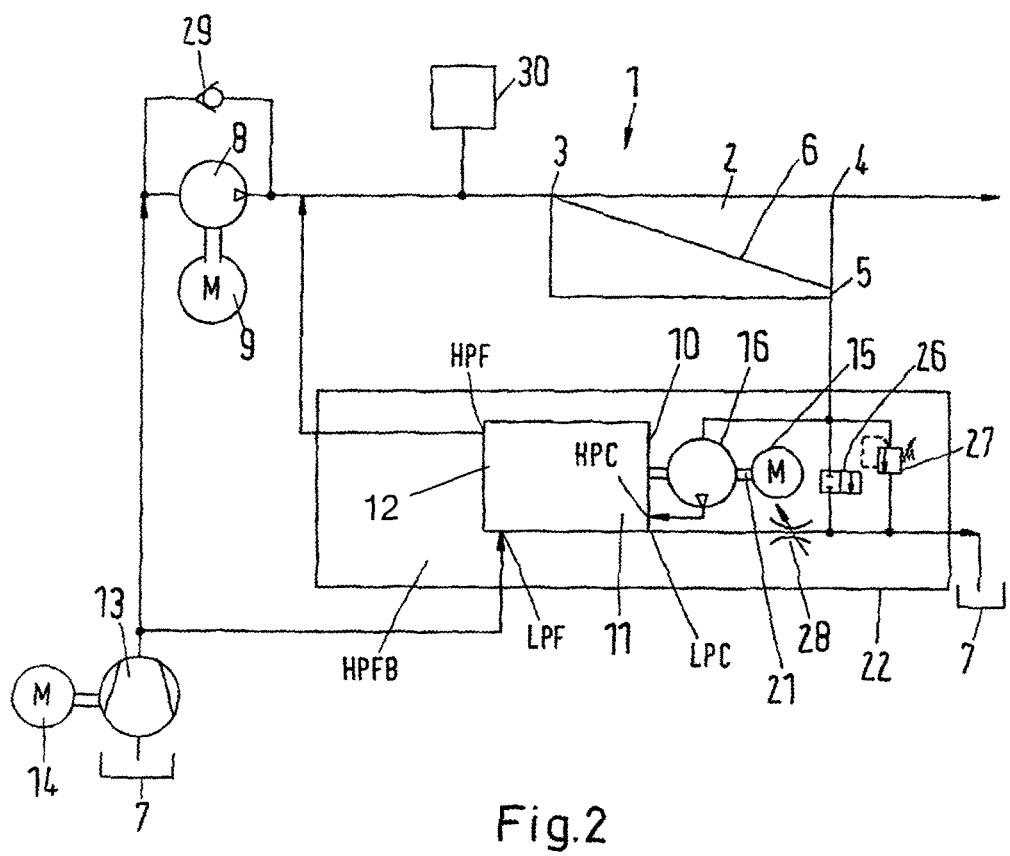
FIG. 2 shows a second embodiment of a reverse osmosis system.

FIG. 2 shows a modified embodiment, in which the same elements as in FIG. 1 have the same reference signs. For reasons of clarity, the control device 18 and its connections are not shown here.

In this embodiment, the pressure exchanger 11 and the displacement pump 16 are assembled to one component 22.

The motor 15 is connected to both the pressure exchanger 11 and the displacement pump 16 via a common drive shaft 21. In this connection, front sides of the displacement pump 16 and the pressure exchanger 11 are connected, for example with flanges arranged on the front sides, bolts, not shown in detail, ensuring that the displacement pump 16 and the pressure exchanger 11 form a unit.

By means of this assembly to one unit 22, it can now be ensured that, in a manner of speaking, the high-pressure concentrate connection HPC and the high-pressure feed water connection HPF are arranged on one line and are in alignment with an outlet 23 of the displacement pump 16. The displacement pump 16, in this case, for example, a gerotor pump, can then supply pressure boosted feed water at its outlet 23. The pressure at the high-pressure feed water connection HPF then corresponds to the pressure at the outlet of the high-pressure pump 8.

Due to the assembly of displacement pump 16 and pressure exchanger 11, an external piping, that is, a piping between the individual parts can be avoided. On the one side, this saves costs during manufacturing. Further, the energy consumption is reduced, as pressure losses can be reduced.

Further, an advantage occurs in that at the pressure exchanger 11 and at the displacement pump 16, the drive shaft 21 has a common shaft sealing area 24. Accordingly, the drive shaft 21 must only be sealed towards the outside at the pressure exchanger 11. For this purpose, a sealing 25 is provided at the front side of the pressure exchanger 11 that faces away from the displacement pump 16. This sealing 25 is loaded by a relatively low pressure.

FIG. 2 shows that the concentrate side 10 of the pressure exchanger 11 is provided with several concentrate flow influencing devices. These include a bypass valve 26 that can generate a short circuit over the inlet of the displacement pump 16 and be opened manually or by a control device, a pressure relief valve 27 that reacts to an overpressure and permits this overpressure to be discharged to the storage 7, and a throttle valve 28 that contributes to keeping the risk of cavitation small and controlling the fluid flow from the low-pressure feed water connection LPF to the low-pressure concentrate connection LPC.

In parallel to the high-pressure pump 8 is arranged a non-return valve 29 that is, for example, formed as a spring-loaded non-return valve and prevents the pressure difference over the high-pressure pump 8 from becoming too large.

The listing of the valves is not necessarily complete. For example, also deaeration valves for all devices are possible.

In a manner not shown in detail, all embodiments may provide that also in connection with the low-pressure feed water connection LPF or the low-pressure concentrate connection LPC a measuring motor is arranged to drive the pressure exchanger 11. In this case, the pressure from the feed pump 13 would have to be increased in order to be able drive the measuring motor that can then in turn drive the pressure exchanger 11.

FIGS. 1 and 2 further show a concentrate sensor 30 that is connected to an adjustment device of the displacement pump 16. In this case, the displacement pump 16 is made with an adjustable displacement. The concentrate sensor 30 currently determines the concentration of the feed water supplied to the membrane unit 2. When it detects that concentrate (or too much concentrate) gets into the feed water, the displacement of the displacement pump 16 is reduced accordingly, so that the output of the displacement pump 16 is adapted.

Figure 3:
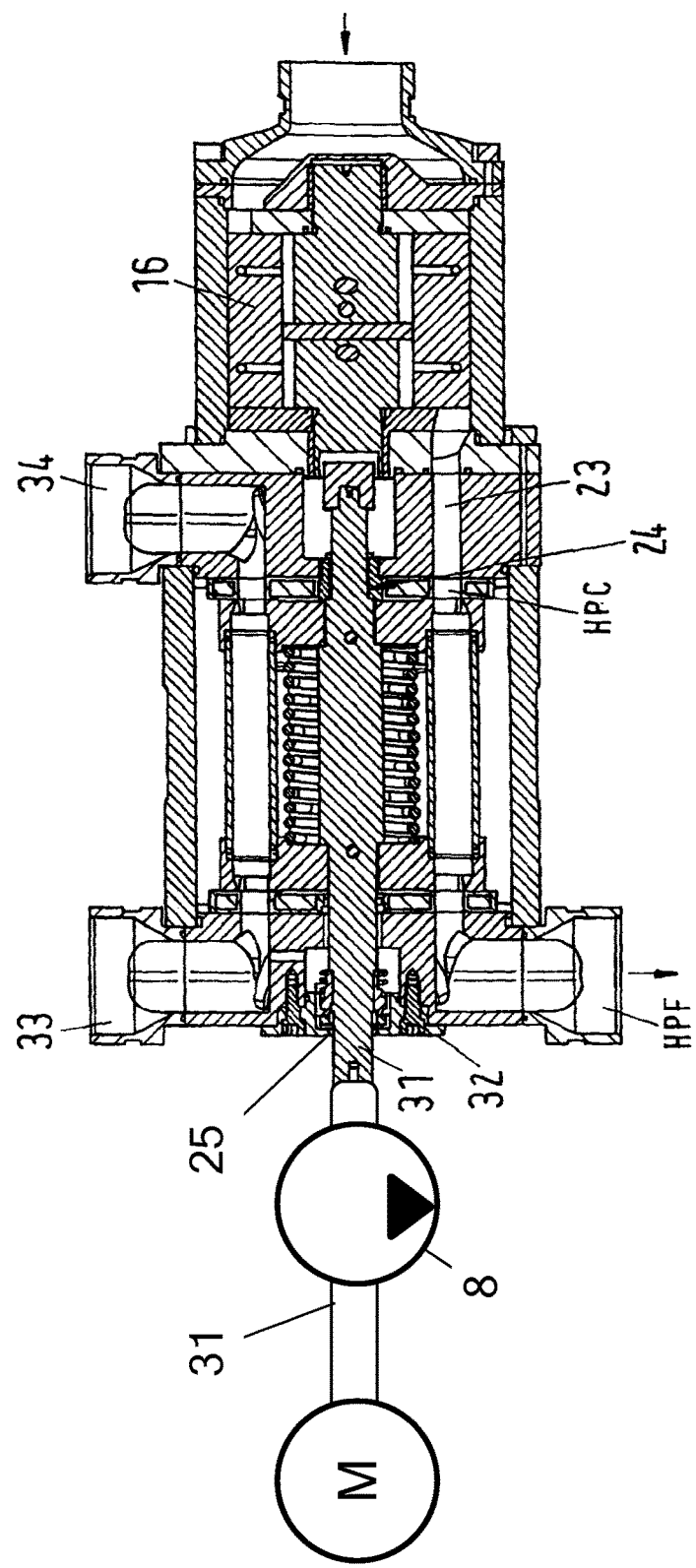
FIG. 3 is a schematic sectional view of a unit with pressure exchanger and displacement pump, and high pressure pump on a common drive shaft with the unit.

Further sensors, for example flow sensors, can be used in suitable spots. In FIG. 3 the pressure exchanger 11 and the displacement pump 16 are assembled to one component. The pressure exchanger 11 and the displacement pump 16 have a common drive shaft 31. In this connection, the drive shaft 31 also extends through a front side 32 of the pressure exchanger 11 that faces away from the displacement pump 16.

Also the high-pressure pump 8 can be arranged at the front side 32. The drive shaft 31 can then also extend through the high-pressure pump 8, so that on a side facing away from the pressure exchanger 11 it can be connected to a motor.

The pressure exchanger has a first connection 33 and a second connection 34, one of the connections 33, 34 being the low-pressure feed water connection LPF and the respective other connection 33, 34 being the low-pressure concentrate connection LPC.

The allocation of the connection 33 as low-pressure feed water connection LPF adjacent to the front wall 32 and opposite to the high-pressure feed water connection HPF is particularly advantageous, if the high-pressure pump is arranged at the front wall 32.

The pressure exchanger 11 and the high-pressure pump 8 can then have the connection 33 as common low-pressure feed water connection LPF and also use the high-pressure feed water connection HPF in common. Compared with a normal process, in which the low-pressure feed water connection LPF is arranged on the same side as the high-pressure feed water connection HPF, the pressure exchanger will then be passed by the flow in the opposite direction, as the low-pressure feed water connection LPF is arranged on the side of the high-pressure concentrate connection HPC, and the high-pressure feed water connection HPF is arranged on the side of the low-pressure concentrate connection LPC. Thus, the pressure exchanger 11 and the high-pressure pump 8 can be connected by means of common pipes to the membrane unit 2 and the feed water pump 13, respectively. This ensures a very simple design that is highly unsusceptible to faults.

Although various embodiments of the present invention have been described and shown, the invention is not restricted thereto, but may also be embodied in other ways within the scope of the subject-matter defined in the following claims.

What is claimed is:

1. A reverse osmosis system comprising:
   at least one membrane unit comprising an inlet, a permeate outlet and a concentrate outlet,
   a high-pressure pump that is connected to the inlet,
   a pressure exchanger comprising at least one high-pressure concentrate connection, and
   a booster pump,
   wherein the booster pump is a displacement pump that is arranged between the concentrate outlet and the high-pressure concentrate connection of the pressure exchanger and configured to feed concentrate from the concentrate outlet into the high-pressure concentrate connection of the pressure exchanger, and
   wherein the pressure exchanger and said displacement pump have a common drive shaft.

2. The reverse osmosis system according to claim 1, wherein the volumes of the pressure exchanger and the displacement pump are adapted to one another.

3. The reverse osmosis system according to claim 1, wherein the displacement pump is made as a variable displacement pump.

4. The reverse osmosis system according to claim 3, wherein it has at least one concentrate sensor.

5. The reverse osmosis system according to claim 1, wherein the displacement pump and the pressure exchanger have a common shaft sealing area.

6. The reverse osmosis system according to claim 1, wherein the displacement pump has a pump outlet on a front side, with which it is arranged on the pressure exchanger.

7. The reverse osmosis system according to claim 6, wherein the pump outlet is arranged opposite to an outlet (HPF) of the pressure exchanger.

8. The reverse osmosis system according to claim 5, wherein a unit comprising the displacement pump and the pressure exchanger can also be operated in the opposite flow direction, meaning that the displacement pump is connected in series after the pressure exchanger.

9. The reverse osmosis system according to claim 1, wherein the high-pressure pump has a common drive shaft with the displacement pump.

10. The reverse osmosis system according to claim 9, wherein the high-pressure pump, the pressure exchanger and the displacement pump are assembled to form one unit.

11. The reverse osmosis system according to claim 10, wherein the pressure exchanger is arranged between the displacement pump and the high-pressure pump.

12. The reverse osmosis system according to claim 11, wherein the pressure exchanger and the high-pressure pump have a common outlet (HPF) from the one unit and/or a common inlet (LPF) into the one unit.

13. The reverse osmosis system according to claim 1, wherein, on the concentrate side, the pressure exchanger has a concentrate influencing device comprising at least one of the following elements: a bypass valve, a pressure relief valve and a throttle valve.

14. The reverse osmosis system according to claim 1, wherein a non-return valve is arranged in parallel to the high-pressure pump.

15. A reverse osmosis system comprising:
   at least one membrane unit comprising an inlet, a permeate outlet and a concentrate outlet;
   a high-pressure pump that is connected to the inlet;
   a pressure exchanger comprising at least one high-pressure concentrate connection; and
   a booster pump;
   wherein the booster pump is a displacement pump that is arranged between the concentrate outlet and the high-pressure concentrate connection of the pressure exchanger and configured to feed concentrate from the concentrate outlet into the high-pressure concentrate connection of the pressure exchanger, and
   wherein said high-pressure pump and said displacement pump have a common drive shaft that extends through said pressure exchanger.

16. The reverse osmosis system according to claim 15, wherein the volumes of the pressure exchanger and the displacement pump are adapted to one another.

17. The reverse osmosis system according to claim 15, wherein the displacement pump is made as a variable displacement pump.

18. The reverse osmosis system according to claim 17, additionally comprising at least one concentrate sensor.

* * * * *